Sept. 18, 1956　　　J. W. GRAY　　　2,763,430
RECTANGULAR TO POLAR COORDINATE CONVERTER
Filed Dec. 11, 1945
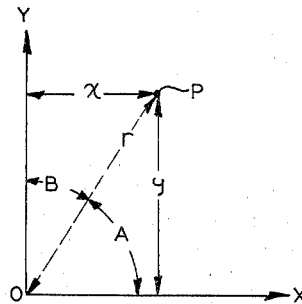
FIG.1
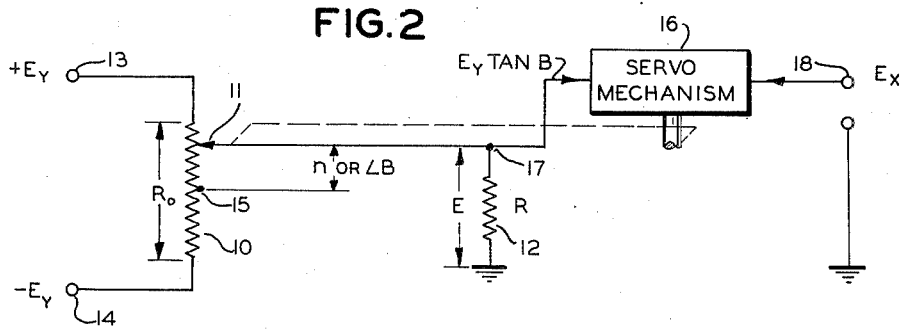
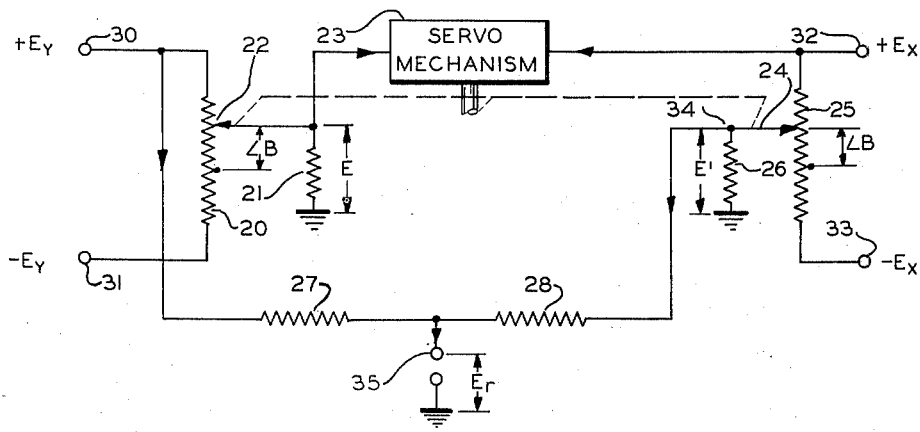
INVENTOR
JOHN W. GRAY
BY *Murray O. Hayes*
ATTORNEY United States Patent Office 2,763,430
Patented Sept. 18, 1956

2,763,430

RECTANGULAR TO POLAR COORDINATE CONVERTER

John W. Gray, Cambridge, Mass., assignor, by mesne assignments, to the United States of America as represented by the Secretary of the Navy Application December 11, 1945, Serial No. 634,291

9 Claims. (Cl. 235—61)

This invention relates to electrical computing systems and more particularly to an electrical computing system for transforming the indications representative of the rectangular coordinates of a given point in a plane to indications representing the equivalent polar coordinates of that point.

There are numerous practical problems which inherently require for their solution the conversion of rectangular coordinates to the equivalent polar form. To cite but one example, the solution of the so-called bombing problem usually involves determining the slant range or the dropping angle from the known quantities, altitude and ground speed. Previous methods for performing this function automatically and with reasonable accuracy have required the use of relatively complex mechanical or electrical devices.

It is accordingly an object of this invention to provide a simple and accurate means for rapidly and continuously converting electrical quantities proportional to the rectangular coordinates of a given point to quantities proportional to the polar coordinates of that point.

Another object of this invention is to provide a means for converting electrical input signals proportional to the X and Y coordinates of a given point in a rectangular coordinate system to a mechanical displacement proportional to the polar angle and a voltage proportional to the radius vector of a given point in a polar coordinate system of common origin.

It is a further object of this invention to provide a means for converting electrical voltages proportional to the sine and cosine of a given angle to a mechanical displacement proportional to that angle.

These and other objects and features of the invention will become apparent upon consideration of the following detailed description with the accompanying drawings, of which:

Fig. 1 is a diagram illustrating certain geometric relations useful in explaining the principles of this invention;

Fig. 2 is a schematic diagram of an electrical circuit embodying a principle of the invention; and Fig. 3 is a schematic diagram representing one form the invention may take.

Referring now to Fig. 1, point P can be located with respect to the coordinate axes X and Y by the rectangular coordinates $x$ and $y$. Alternatively, the point P can be located with respect to the common origin O by the length, $r$, of the radius vector and the polar angle between the radius vector and one axis, i. e., the polar coordinates of point P. Since A and B are complementary angles, it is evident that an indicator designed to give angle B could also be calibrated to read angle A, if desired. In order to achieve a transformation from the rectangular coordinate system to the polar coordinate system, it is necessary to find $r$ and B in terms of $x$ and $y$.

From elementary trigonometry:

$$x = y \tan B \quad (1)$$

It is also apparent that:

$$x = r \sin B \text{ and } y = r \cos B \quad (2)$$

Using the fundamental trigonometric identity:

$$\tan \frac{B}{2} = \frac{1 - \cos B}{\sin B} \quad (3)$$

The expression for $r$ is derived as follows:

$$\tan \frac{B}{2} = r \frac{(1 - \cos B)}{r \sin B} \quad (4)$$

$$= \frac{r - y}{x}$$

or, $$r = y + x \tan \frac{B}{2} \quad (5)$$

Thus, Equations 1 and 5 give the relations to be satisfied between $r$, B and $x$, $y$.

The circuits of this invention effectively solve these two equations for $r$ and B. Since the tangent function appears in both equations, it is obvious that a device is required which yields an output that varies as the tangent of an applied control signal.

Considering now Fig. 2, potentiometer 10, having the movable tap or slider 11 and the resistor 12 comprise a loaded linear potentiometer. The operation of such a device to give a voltage proportional to the tangent of the slider displacement is described in the co-pending application, Serial No. 549,045, filed August, 11, 1944. In the interest of clarity, however, the operation of the loaded linear potentiometer of Fig. 2 will be described.

The tangent of any angle $\theta$ can be expanded in a power series as follows:

$$\tan \theta = \theta + \frac{\theta^3}{3} + \frac{2\theta^5}{15} + \cdots \quad (6)$$

It will now be shown that the loaded linear potentiometer of Fig. 2 yields an output voltage the expression for which is very nearly that of Equation 6. The equal and opposite voltages $+Ey$ and $-Ey$ applied to terminals 13 and 14 respectively are proportional to the $y$ coordinate of the above-mentioned point P. These voltages are derived from a source whose output is balanced with respect to ground and may be push-pull unidirectional voltages or alternating voltages 180° out of phase. Let the value in ohms of potentiometer 10 be represented by $Ro$ and that of resistor 12 by R. The distance $n$ is proportional to the fraction of the resistance $$\left(\frac{Ro}{2}\right)$$

between the electrical center 15 of potentiometer 10 and the slider arm 11. Assume that the servo-mechanism 16 takes negligible current from the potentiometer. From elementary network theory considerations, the voltage E from terminal 17 to ground will be:

$$E = \frac{nEy}{1 + \frac{Ro}{4R}(1 - n^2)} = \frac{nEy}{\left(1 + \frac{Ro}{4R}\right) - \frac{Ro}{4R}n^2} \quad (7)$$

By using the binomial theorem to expand the denominator in series form, Equation 7 can be written:

$$\frac{E}{Ey} = \frac{n}{1 + Ro}\left[1 + \left(\frac{Ro/4R}{1 + \frac{Ro}{4R}}\right)n^2 + \left(\frac{Ro/4R}{1 + \frac{Ro}{4R}}\right)^2 n^4 + \cdots\right] \quad (8)$$

Letting $$Z = \frac{Ro/4R}{1 + \frac{Ro}{4R}}$$

this series becomes:

$$\frac{E}{Ey} = (1-Z)[n + Zn^3 + Z^2n^5 + \ldots] \quad (9)$$

The similarity of the above Equation 9 to the tangent series given in Equation 6 becomes apparent if the resistance values $Ro$ and $R$ are chosen such that $Z = \frac{1}{3}$, in which case:

$$\frac{E}{Ey} = \frac{2}{3}\left[n + \frac{n^3}{3} + \frac{n^5}{9} + \ldots\right] \quad (10)$$

Thus it is clear that for the first two terms of the expansion, the output voltage $E$ is proportional to $Ey \tan n$.

If the slider 11 is now mechanically linked to some rotating device in such a manner that the slider moves from the electrical center 15 of potentiometer 10 to one end thereof when the device turns through an angle of one radian, then $n$ is always numerically equal to the rotation angle in radians. If this angle is the polar angle $B$ previously mentioned, the output voltage $E$ is proportional to $Ey \tan B$.

In Fig. 2 the output voltage of the potentiometer is applied to one input terminal of a conventional servomechanism 16. The other input terminal of the servomechanism is connected to a source of voltage $Ex$ applied to terminal 18. The voltage $Ex$ is made proportional to the $x$ coordinate of the above-mentioned point P. As indicated by the broken line the control shaft of the servomechanism is mechanically linked to the potentiometer slider 11. It is clear from Equation 1 that when $Ey \tan B = Ex$ the position of the slider will correspond to the polar angle $B$ determined by the coordinates $x$ and $y$. The servomechanism 16 establishes this condition of equality by moving the slider arm along the potentiometer 10 until the difference between $Ey \tan B$ and $Ex$ is zero. Thus, the circuit of Fig. 2 provides a mechanical displacement proportional to the polar angle $B$ when voltages proportional to the rectangular coordinates of point P are applied as indicated.

The inherent error of the result can be determined by comparing Equations 6 and 10. It will be noted that differences are encountered only in the terms of fifth and higher degrees. For small angles, the error introduced by using the approximation is negligible.

Referring now to Fig. 3, potentiometer 20, resistor 21, slider 22 and the servomechanism 23 comprise an angle determining device similar to that described in connection with Fig. 2. The control shaft of the servomechanism is also mechanically linked to tap or slider 24 of the loaded linear potentiometer comprising potentiometer 25 and resistor 26. Resistors 27 and 28 are large compared to the resistances of the potentiometer networks. The voltages $+Ey$, $-Ey$, $+Ex$ and $-Ex$, applied to terminals 30, 31, 32 and 33, respectively, are proportional to the $y$ and $x$ coordinates of the point P, and are derived from sources balanced to ground. Let the values of resistors 20, 21, 25 and 26, be $Ro$, $R$, $Ro'$ and $R'$ respectively. $Ro$ and $R$ are again chosen such that $Z = \frac{1}{3}$. By the action described above the sliders 22 and 24 will take up a position proportional to the angle $B$. $Ro'$ and $R'$ are chosen such that, $$Z = \frac{Ro'/4R'}{1 + \frac{Ro'}{4R'}} = \frac{1}{12}$$

for reasons to be described hereinbelow. The voltage $E'$ from terminal 34 to ground is then given by:

$$E' \propto Ex\left[B + \frac{B^3}{12} + \frac{B^5}{144} + \ldots\right] \quad (11)$$

The voltage $E'$ is added to $Ey$ by means of the mixing resistors 27 and 28, whose values are chosen such that resistor 28 has twice the resistance of resistor 27. Consequently, the output voltage, $Er$, at terminals 35 will be:

$$Er \propto Ey + \frac{Ex}{2}\left[B + \frac{B^3}{12} + \frac{B^5}{144} + \ldots\right] \quad (12)$$

or, $$E \propto Ey + Ex\left[\frac{B}{2} + \frac{1}{3}\left(\frac{B}{2}\right)^3 + \frac{1}{9}\left(\frac{B}{2}\right)^5 + \ldots\right] \quad (13)$$

approximately, $$Er \propto Ey + Ex \tan \frac{B}{2} \quad (14)$$

Comparison of Equation 14 with Equation 5 demonstrates that $Er$ is substantially proportional to $r$, the radius vector.

Therefore, if voltages proportional to the rectangular coordinates of the given point P are applied to the circuit of Fig. 3 there will result a mechanical displacement proportional to the polar angle $B$ and an output voltage proportional to the radius vector $r$. This information can be applied to suitable indicating devices and with proper choice of proportionality factors, the invention can be made to indicate the desired quantities directly in any convenient units. The accuracy of the indications within the normal limits of the angle $B$ is sufficient for all practical applications of the system. The simplicity of design and construction is evident from the circuit of Fig. 3.

It is to be noted that other devices providing an output signal proportional to a tangent of a mechanical displacement can be substituted for the loaded linear potentiometers of the embodiment of Fig. 2 and Fig. 3 without departing from the spirit of the invention. In a like manner, other impedances may be substituted for the mixing resistors shown in Fig. 3. The invention is not restricted to the particular relative resistance values mentioned in the foregoing description nor to the type of servomechanism employed.

The invention is to be limited only by the appended claims.

I claim:

1. An apparatus for producing indications representative of the polar coordinates of a given point from indications representative of said point in a rectangular coordinate system of common origin, comprising means for combining a first voltage proportional to the $x$ coordinate of said point and a second voltage proportional to the $y$ coordinate of said point, said $x$ and $y$ coordinates being considered with respect to said rectangular coordinate system, to produce a mechanical displacement substantially proportional to the polar angle of said point and a voltage substantially proportional to the radius vector of said point, said means comprising a first device receiving said second voltage and providing an output voltage substantially proportional to the product of said second voltage and the tangent function of an applied mechanical displacement, a means mechanically linked to said first device for causing said mechanical displacement to be substantially proportional to said polar angle by equating said output voltage to said first voltage, a second device mechanically linked to said first device and receiving said first voltage and providing an output voltage substantially proportional to the product of said first voltage and the tangent function of a fraction of said mechanical displacement, and a means for combining the output voltage of said second device with said second voltage to produce a voltage substantially proportional to said radius vector.

2. An apparatus for combining a first voltage proportional to the sine of a given angle and a second voltage proportional to the cosine of said angle to produce a mechanical displacement substantially proportional to said angle, said apparatus comprising a device receiving said second voltage and providing an output voltage substantially proportional to the product of said second voltage and the tangent function of an applied mechanical displacement, and a means mechanically linked to said device to cause said mechanical displacement to be substantially proportional to said angle by equating said output voltage to said first voltage.

3. An apparatus for combining a first voltage proportional to the sine of a given angle and a second voltage proportional to the cosine of said angle to produce a mechanical displacement proportional to said angle, said apparatus comprising an impedance connected to the source of said second voltage, the output voltage of said impedance being adjustable and substantially proportional to the product of said second voltage and the tangent function of a mechanical displacement applied thereto, a servo-mechanism for producing said mechanical displacement, and a means for applying said output voltage and said first voltage to the input terminals of said servo-mechanism, whereby said servo-mechanism equates said output voltage to said first voltage and therefore causes said mechanical displacement to be substantially proportional to said angle.

4. Apparatus for converting a pair of voltages representing respectively the X and Y coordinates of a given point in rectangular coordinates to a mechanical displacement substantially proportional to the polar angle and a voltage proportional to the radius vector of said point in a polar coordinate system of common origin, comprising, first and second linear potentiometers, a servo-mechanism having a rotatable shaft mechanically connected to the movable contacts of said first and second potentiometers for displacement thereof such that rotation of said shaft through one radian displaces said moving contacts proportionally from the electrical centers of said potentiometers to one end thereof respectively, means for energizing the first of said potentiometers by a voltage proportional to said Y coordinate and the second of said potentiometers by a voltage proportional to said X coordinate, means for loading said first potentiometer to derive a first output voltage proportional to the product of said Y coordinate and the tangent of the angular rotation of said shaft from a position corresponding to the electrical center of said potentiometers, means for loading said second potentiometer to derive a second output voltage proportional to the product of said X coordinate and the tangent of half the angular rotation of said shaft from said position corresponding to the electrical center of said potentiometers, an impedance network for adding said second output voltage and a voltage proportional to said Y coordinate to derive a voltage proportional to said radius vector, and means applying said first output voltage and a voltage proportional to said X coordinate to the electrical inputs of said servo-mechanism whereby said shaft is rotated to a position at which said servo-mechanism input voltages are equal, said shaft position thereby indicating said polar angle.

5. Apparatus for converting a pair of voltages proportional respectively to the X and Y coordinates of a point in rectangular coordinates to a mechanical displacement substantially proportional to the polar angle of said point in a polar coordinate system of common origin, comprising, a linear potentiometer energized at its terminals by equal and opposite voltages proportional to said Y coordinate, a servo-mechanism having a rotatable shaft mechanically connected to the movable contact of said potentiometer for displacement thereof such that rotation of said shaft through one radian proportionally displaces said movable contact from the electrical center of said potentiometer to one end thereof, a resistor having a value equal to one half the resistance of said potentiometer connected between said movable contact and ground to form a loaded linear potentiometer having an output voltage at said movable contact substantially proportional to the product of said Y coordinate voltage and the tangent of the angular rotational displacement of said shaft in radians from the position corresponding to the electrical center of said potentiometer, and means applying said output voltage and a voltage proportional to said X coordinate to the electrical inputs of said servo-mechanism, whereby said shaft is rotated to a position at which said output voltage equals said X coordinate voltage, said shaft position thereby indicating the value of said polar angle.

6. Apparatus for converting a pair of voltages proportional respectively to the X and Y coordinates of a point in rectangular coordinates to a mechanical displacement substantially proportional to the polar angle of said point in a polar coordinate system of common origin, comprising, a linear potentiometer energized at its terminals by equal and opposite voltages proportional to said Y coordinate, a servo-mechanism having a rotatable shaft mechanically connected to the movable contact of said potentiometer for displacement thereof, equal increments of angular rotation sweeping equal increments of resistance, a resistor having a value equal to one half the resistance of said potentiometer connected between said movable contact and ground to form a loaded linear potentiometer having an output voltage at said movable contact substantially proportional to the product of said Y coordinate voltage and the tangent of the angle in radians expressed as the fractional displacement of said movable contact from the electrical center of said potentiometer, and means applying said output voltage and a voltage proportional to said X coordinate to the electrical inputs of said servomechanism whereby said shaft is rotated to a position at which said output voltage equals said X coordinate voltage, said shaft position thereby indicating the value of said polar angle.

7. Apparatus for converting a pair of voltages proportional respectively to the sine and cosine functions of a given angle to a mechanical displacement substantially equal to said angle, comprising, a linear potentiometer energized at its terminals by equal and opposite voltages proportional to said cosine function, a servo-mechanism having a rotatable shaft mechanically connected to the movable contact of said potentiometer for displacement thereof such that rotation of said shaft through one radian proportionally displaces said movable contact from the electrical center of said potentiometer to one end thereof, a resistor having a value equal to one half the resistance of said potentiometer connected between said movable contact and ground to load said potentiometer whereby the output voltage at said movable contact is substantially proportional to the product of said cosine voltage and the tangent of the angular rotation of said shaft from the position corresponding to the electrical center of said potentiometer, and means applying said output voltage and a voltage proportional to said sine function to the electrical inputs of said servo-mechanism, whereby said shaft is rotated to a position at which said output voltage equals said sine voltage, said shaft position thereby indicating the value of said given angle.

8. Apparatus for converting a pair of voltages proportional respectively to the X and Y coordinates of a point in rectangular coordinates to a mechanical displacement substantially proportional to the polar angle and a voltage proportional to the radius vector of said point in a polar coordinate system of common origin, comprising a linear potentiometer energized at its terminals by equal and opposite voltages proportional to said Y coordinate, a servo-mechanism having a rotatable shaft mechanically connected to the movable contact of said potentiometer for displacement thereof, equal increments of angular rotation sweeping equal increments of resistance, a resistor having a value equal to one half the resistance of said potentiometer connected between said movable contact and ground to load said potentiometer whereby the output voltage at said movable contact is substantially proportional to the product of said Y coordinate voltage and the tangent of the angle in radians expressed as the fractional displacement of said movable contact from the electrical center of said potentiometer, means applying said output voltage and a voltage proportional to said X coordinate to the electrical inputs of said servo-mechanism, whereby said shaft is rotated to a position at which said output voltage equals said X coordinate voltage, said shaft positions thereby indicating the value of said polar angle, a second linear potentiometer energized at its terminals by equal and opposite voltages proportional to said X coordinate, the movable contact of said potentiometer being mechanically connected to said rotatable shaft of said servo-mechanism for displacement thereof, a second resistor having a value equal to eleven-fourths the resistance of said second potentiometer connected between the movable contact of said second potentiometer and ground to load said second potentiometer, said second loaded linear potentiometer having an output voltage at its movable contact substantially proportional to the product of said X coordinate voltage and the tangent function of one half the angle in radians expressed as the fractional displacement of said movable contact from the electrical center of said second potentiometer by said shaft, and an impedance network to add said output voltage from said second potentiometer to a voltage proportional to said Y coordinate to produce a voltage substantially proportional to the radius vector of said point.

9. Apparatus for converting a pair of voltages proportional respectively to the X and Y coordinates of a point in rectangular coordinates to a mechanical displacement proportional to the polar angle and a voltage proportional to the radius vector of said point in a polar coordinate system of common origin, comprising, a first linear potentiometer energized at its terminals by equal and opposite voltages proportional to said Y coordinate, a servo-mechanism having a rotatable shaft mechanically connected to the movable contact of said potentiometer for displacement thereof such that rotation of said shaft through one radian displaces proportionally said movable contact from the electrical center of said potentiometer to one end thereof, a resistor having a value equal to one half the resistance of said potentiometer connected between said movable contact and ground to form a loaded linear potentiometer having an output voltage at said movable contact substantially proportional to the product of said Y coordinate voltage and the tangent of the angular rotation of said shaft in radians from the position corresponding to the electrical center of said potentiometer, means applying said output voltage and a voltage proportional to said X coordinate to the electrical inputs of said servo-mechanism, whereby said shaft is rotated to a position at which said output voltage equals said X coordinate voltage, said shaft position thereby indicating the value of said polar angle, a second linear potentiometer energized at its terminals by equal and opposite voltages proportional to said X coordinate, the movable contact of said second potentiometer being mechanically connected to said rotatable shaft of said servo-mechanism for displacement thereof such rotation of said shaft through one radian displaces said movable contact of said second potentiometer from the electrical center to one end thereof, a second resistor having a value equal to eleven fourths the resistance of said second potentiometer connected between the movable contact of said second potentiometer and ground to form a second loaded linear potentiometer, said second loaded linear potentiometer having an output voltage at its movable contact substantially proportional to the product of said X coordinate voltage and the tangent function of one half the angular rotation of said shaft in radians, and an impedance network to add the output voltage of said second potentiometer and a voltage proportional to said Y coordinate to produce a voltage substantially proportional to the radius vector of said point.

References Cited in the file of this patent

UNITED STATES PATENTS

| | | |
|---|---|---|
| 2,406,016 | Heising | Aug. 20, 1946 |
| 2,497,216 | Greenough | Feb. 14, 1950 |
| 2,510,384 | Dehmel | June 6, 1950 |
| 2,511,614 | Agins et al. | June 13, 1950 |

FOREIGN PATENTS

| | | |
|---|---|---|
| 620,867 | Great Britain | Mar. 31, 1949 |